(12) United States Patent
Hong et al.

(10) Patent No.: US 11,108,518 B2
(45) Date of Patent: Aug. 31, 2021

(54) APPARATUS AND METHOD FOR TRANSMITTING REFERENCE SIGNAL IN WIRELESS COMMUNICATION SYSTEM

(71) Applicant: Samsung Electronics Co., Ltd., Suwon-si (KR)

(72) Inventors: Sungnam Hong, Suwon-si (KR); Yongok Kim, Seoul (KR); Chanhong Kim, Suwon-si (KR); Yeohun Yun, Hwaseong-si (KR); Jongbu Lim, Seoul (KR); Taeyoung Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/650,640

(22) PCT Filed: Oct. 1, 2018

(86) PCT No.: PCT/KR2018/011655
§ 371 (c)(1),
(2) Date: Mar. 25, 2020

(87) PCT Pub. No.: WO2019/066627
PCT Pub. Date: Apr. 4, 2019

(65) Prior Publication Data
US 2020/0259613 A1   Aug. 13, 2020

(30) Foreign Application Priority Data
Sep. 29, 2017  (KR) .................... 10-2017-0127471

(51) Int. Cl.
*H04L 5/00* (2006.01)
*H04W 72/04* (2009.01)

(52) U.S. Cl.
CPC ......... *H04L 5/0048* (2013.01); *H04W 72/042* (2013.01)

(58) Field of Classification Search
CPC ........................ H04L 5/0048; H04W 72/042
See application file for complete search history.

(56) References Cited

U.S. PATENT DOCUMENTS

2011/0176502 A1    7/2011  Chung et al.
2013/0242889 A1*   9/2013  Khoryaev ............. H04L 1/1864
(Continued)

FOREIGN PATENT DOCUMENTS

| EP | 2306659 A2 | 4/2011 |
| KR | 10-2016-0106664 A | 9/2016 |
| WO | 2014/088185 A1 | 6/2014 |

OTHER PUBLICATIONS

European Search Report dated Sep. 18, 2020, issued in European Application No. 18862034.8-1205.
(Continued)

*Primary Examiner* — Ronald B Abelson
(74) *Attorney, Agent, or Firm* — Jefferson IP Law, LLP

(57) ABSTRACT

Disclosed are: a communication technique for merging, with IoT technology, a 5G communication system for supporting a data transmission rate higher than that of a 4G system; and a system therefor. The disclosure can be applied to intelligent services (for example, smart home, smart building, smart city, smart car or connected car, healthcare, digital education, retail, security, and safety related services, and the like) on the basis of 5G communication technology and IoT-related technology. According to the disclosure, a terminal of a communication system can transmit, to a base station, information related to a mobile characteristic or a channel time-varying characteristic, receive information related to reference signal transmission from the base station, generate a reference signal on the basis of the information related to reference signal transmission, and transmit the reference signal to the base station.

14 Claims, 16 Drawing Sheets

(56) References Cited

U.S. PATENT DOCUMENTS

| | | | |
|---|---|---|---|
| 2014/0198747 A1* | 7/2014 | Ouchi | H04L 5/0053 |
| 2015/0030001 A1* | 1/2015 | Koskinen | H04W 36/0083 |
| 2015/0280886 A1 | 10/2015 | Abdoli et al. | |
| 2016/0087709 A1* | 3/2016 | Horiuchi et al. | H04L 5/14 |
| 2016/0105264 A1* | 4/2016 | Chen | H04W 4/70 |
| 2016/0241308 A1 | 8/2016 | Kim et al. | |
| 2017/0019886 A1* | 1/2017 | Patel | H04W 4/70 |

OTHER PUBLICATIONS

CMCC, "Discussion on DMRS sharing for uplink sTTI transmission", R1-1705108, 3GPP TSG RAN WG1 Meeting #88b, Spokane, USA, See section 2; Mar. 24, 2017.

Zte et al., "Remaining details on DL DMRS and UL DMRS", R1-1715449, 3GPP TSG RAN WG1 Meeting NR#3, Nagoya, Japan, See sections 2.3-2.4; Sep. 12, 2017.

Catt, "PDSCH and PUSCH resource allocation", R1-1715824, 3GPP TSG RAN WG1 Meeting AH_#NR3, Nagoya, Japan, See sections 3.1, 3.2.1; Sep. 12, 2017.

Huawei et al., "Design of DMRS for DL/UL data transmission", R1-1715472, 3GPP TSG RAN WG1 Meeting AH NR#3, Nagoya, Japan, See sections 2.1-4.2; Sep. 11, 2017.

\* cited by examiner

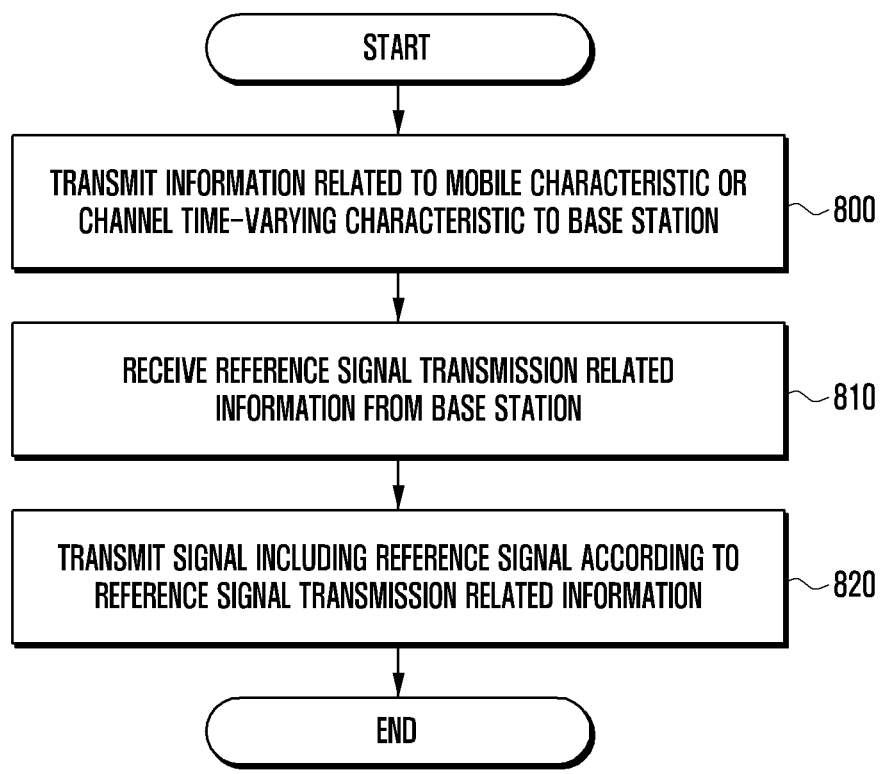

APPARATUS AND METHOD FOR TRANSMITTING REFERENCE SIGNAL IN WIRELESS COMMUNICATION SYSTEM

TECHNICAL FIELD

The disclosure relates to a wireless communication system and, more particularly, to an apparatus and a method for transmitting a reference signal in a wireless communication system.

BACKGROUND ART

In order to meet wireless data traffic demands that have increased after 4G communication system commercialization, efforts to develop an improved 5G communication system or a pre-5G communication system have been made. For this reason, the 5G communication system or the pre-5G communication system is called a beyond 4G network communication system or a post LTE system. In order to achieve a high data transmission rate, an implementation of the 5G communication system in a mmWave band (for example, 60 GHz band) is being considered. In the 5G communication system, technologies such as beamforming, massive MIMO, Full Dimensional MIMO (FD-MIMO), array antenna, analog beam-forming, and large scale antenna are being discussed as means to mitigate a propagation path loss in the mm Wave band and increase a propagation transmission distance. Further, the 5G communication system has developed technologies such as an evolved small cell, an advanced small cell, a cloud Radio Access Network (RAN), an ultra-dense network, Device to Device communication (D2D), a wireless backhaul, a moving network, cooperative communication, Coordinated Multi-Points (CoMP), and received interference cancellation to improve the system network. In addition, the 5G system has developed Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

Meanwhile, the Internet has been evolved to an Internet of Things (IoT) network in which distributed components such as objects exchange and process information from a human-oriented connection network in which humans generate and consume information. An Internet of Everything (IoE) technology in which a big data processing technology through a connection with a cloud server or the like is combined with the IoT technology has emerged. In order to implement IoT, technical factors such as a sensing technique, wired/wireless communication, network infrastructure, service-interface technology, and security technology are required, and research on technologies such as a sensor network, Machine-to-Machine (M2M) communication, Machine-Type Communication (MTC), and the like for connection between objects has recently been conducted. In an IoT environment, through collection and analysis of data generated in connected objects, an intelligent Internet Technology (IT) service to create a new value for peoples' lives may be provided. The IoT may be applied to fields such as those of a smart home, a smart building, a smart city, a smart car, a connected car, a smart grid, health care, a smart home appliance, or high-tech medical services through the convergence of the conventional Information Technology (IT) and various industries.

Accordingly, various attempts to apply the 5G communication to the IoT network are made. For example, the 5G communication technology, such as a sensor network, machine-to-machine (M2M) communication, and machine-type communication (MTC), has been implemented by a technique, such as beamforming, MIMO, and array antennas. The application of a cloud RAN as the big data processing technology may be an example of convergence of the 5G technology and the IoT technology.

In the fifth generation (5G) communication system under study, non-orthogonal multiple access (NOMA) technology has been developed for simultaneous support for massive connection, increase of average throughput, and power consumption reduction of a terminal. The NOMA technology is a technology in which a plurality of terminals share given time and frequency resources with each other and each terminal transmits a signal, and when using this technology, a demodulation reference signal (RS) is required to obtain a channel state of a superimposed signal. At this time, a method for reducing the overhead of the RS is needed.

DISCLOSURE OF INVENTION

Technical Problem

Based on the above discussion, the disclosure provides a method and apparatus for efficiently transceiving a reference signal in a wireless communication system. Specifically, the disclosure provides a method for configuring a reference signal transmission cycle of a terminal, a resource allocation method for transmitting a reference signal, and/or a method and apparatus for providing resource information for use in data transmission of a terminal, by a base station.

Solution to Problem

In accordance with an aspect of the disclosure, a method of a terminal of a communication system includes: transmitting information related to a mobile characteristic or a channel time-varying characteristic to a base station; receiving reference signal transmission related information from the base station; generating a reference signal, based on the reference signal transmission related information; and transmitting the reference signal to the base station. The reference signal transmission related information includes at least one of transmission start position information of the reference signal, transmission interval information of a reference signal onto the time axis, and reference signal transmission pattern information on the frequency axis, the transmission start position information and the reference signal transmission pattern information from the reference signal transmission related information are received by downlink control information, and the transmission interval information is received via higher layer signaling.

In addition, the terminal may further perform receiving information indicating resources used for reference signal transmission by other terminals from the base station, and may further performing transmitting data to the base station using a resource other than the resources used by other terminals to transmit a reference signal.

In addition, a method of a base station of a communication system includes: receiving information related to a mobile characteristic or a channel time-varying characteristic from a terminal; determining a reference signal transmission scheme of the terminal, based on the information related to a mobile characteristic or a channel time-varying characteristic and information that the base station knows in advance; transmitting reference signal transmission related information indicating the reference signal transmission scheme to the terminal; and receiving a reference signal from the terminal. In addition, the information that the base station knows in advance may be at least one of the number of terminals performing overlapping transmission and resource information allocated to the terminal.

In addition, a terminal of a communication system includes: a transceiving unit for transceiving a signal with a base station; and a controller for transmitting information related to a mobile characteristic or a channel time-varying characteristic to the base station, receiving reference signal transmission related information from the base station, generating a reference signal, based on the reference signal transmission related information, and transmitting the reference signal to the base station.

In addition, a base station of a communication system includes: a transceiving unit for transceiving a signal with a terminal; and a controller for controlling to: receive information related to a mobile characteristic or a channel time-varying characteristic from a terminal, determine a reference signal transmission scheme of the terminal, based on the information related to a mobile characteristic or a channel time-varying characteristic and information that the base station knows in advance, transmit reference signal transmission related information indicating the reference signal transmission scheme to the terminal, and receive a reference signal from the terminal.

Advantageous Effects of Invention

According to a method and apparatus according to various embodiments of the disclosure, when a plurality of terminals share given time and frequency resources and transmit signals by applying a non-orthogonal multiple access technology in a wireless communication system, efficient reference signal transmission and reception can be performed by applying a reference signal transmission method that reflects channel characteristics of each terminal. In detail, the overhead for transmitting the reference signal may be greatly reduced.

Effects which can be acquired by the disclosure are not limited to the above described effects, and other effects that have not been mentioned may be clearly understood by those skilled in the art from the following description.

BRIEF DESCRIPTION OF DRAWINGS

FIG. 8 is a view illustrating a method performed by a terminal according to the disclosure;

MODE FOR THE INVENTION

Figure 1:
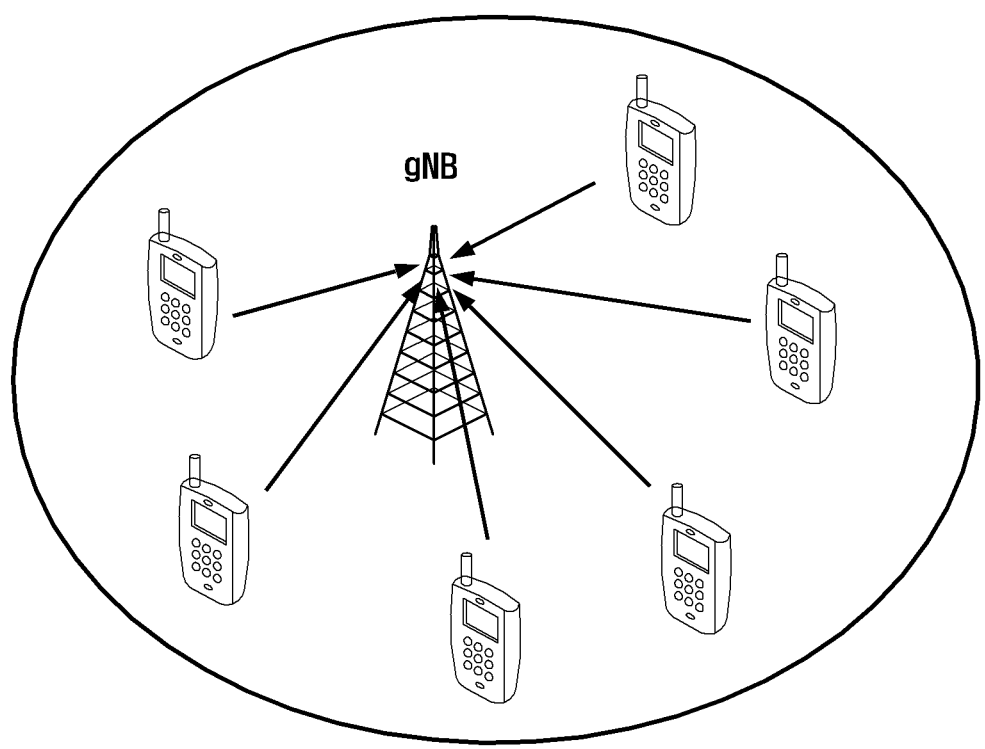
FIG. 1 is a view illustrating an example of signal transceiving between a base station and a terminal when a NOMA technology is applied.

Hereinafter, embodiments of the disclosure will be described in detail with reference to the accompanying drawings.

In describing the exemplary embodiments of the disclosure, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card. Also, in an embodiment, the '~ unit' may include one or more processors.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software and thus, the various embodiments of the disclosure may not exclude the perspective of software.

In order to meet the increasing demand for wireless data traffic after commercialization of fourth generation (4G) communication systems, efforts have been made to develop improved 5G communication systems or pre-5G communication systems. For this reason, a 5G communication system or a pre-5G communication system is called a beyond 4G network communication system or a post long term evolution (post LTE) system. Hereinafter, the "base station" may be mixed with a gNB, an evolved node B (eNB), a base station, and the like, and the "terminal" may be mixed with a user equipment (UE), a terminal, and the like.

In the 5G communication system, a non-orthogonal multiple access (NOMA) technology has been developed for simultaneous support for massive connection, increase of average throughput, and power consumption reduction of a terminal.

When the NOMA technology is applied to uplink transmission, two schemes may be used. A first scheme is to apply the NOMA technology, based on scheduling. In this case, the number of terminals that can be supported simultaneously via overlapping transmission increases, thereby increasing the average throughput. However, in this case, since the terminal needs to request resource allocation via a scheduling request to a base station, power consumption can be reduced less. The second scheme is to apply the NOMA technology without scheduling. In this case, since the scheduling request process is omitted, power consumption may be reduced, but since the base station may have a limitation in detecting active terminals, the number of concurrently supported terminals may be smaller than that of the first scheme.

FIG. 1 is a view illustrating an example of signal transceiving between a base station and a terminal when a NOMA technology is applied. The NOMA technology is a technology in which a plurality of terminals share given time and frequency resources with each other and each terminal transmits signals. That is, the plurality of terminals illustrated in FIG. 1 may transmit and receive their signals at the same time and frequency resources. Therefore, the signals transmitted from each terminal overlap the received signal. In this situation, each transmitter (the terminal in FIG. 1) may apply different codebooks, different interleaving, different spreading sequences, different scrambling, or different channel codes between signals transmitted for each transmitter so that the receiver (the base station of FIG. 1) can distinguish the signal transmitted by each terminal.

A NOMA receiver of the base station may receive a signal in which several signals are superimposed and utilize the characteristics of the above-described terminal-specific codebook, terminal-specific interleaving, terminal-specific spreading sequence, or terminal-specific scrambling or terminal-specific channel code to apply a multi-user signal detection technique and an interference cancellation and/or suppression technique, and through this, a signal transmitted from each terminal may be detected without error.

Such operations of the receiver are performed on the basis of a coherent detection technique that requires fading channel coefficient information of overlapping signals. In particular, channel estimation is necessary when the above-described first scheme is applied. Accordingly, the receiver needs to estimate a fading channel coefficient for the signal from each terminal transmitting the overlapping signals, and it is necessary to receive a reference signal for each terminal to perform this.

In the NOMA transmission technique, the number of terminals sharing given resources may be quite large because a plurality of terminals share the same resource. Therefore, transmitting the reference signal for each terminal using a scheme such as an orthogonal multiple access scheme can greatly reduce resource usage efficiency.

The disclosure relates to an apparatus and a method for supporting non-orthogonal multiple access technology in a wireless communication system. Specifically, there is described a method and an apparatus for solving the problem of increasing reference signal transmission overhead by allowing each terminal to efficiently transmit a reference signal is described, when applying a non-orthogonal multiple access technology that transmits a signal while a plurality of terminals share each other in a wireless communication system.

In addition, in the disclosure, although various embodiments are described using terms used in some communication standards (e.g., third generation partnership (3GPP)), this is merely an example for description, and the various embodiments of the disclosure can be easily modified and applied to other communication systems.

According to the apparatus and method according to various embodiments of the disclosure, in a wireless communication system, when a plurality of terminals share given time and frequency resources by using a non-orthogonal multiple access technique and transmit signals, an overhead for transmitting a reference signal can be greatly reduced by applying a reference signal transmission scheme reflecting channel characteristics of each terminal.

Effects obtained in the disclosure are not limited to the above-mentioned effects, and other effects not mentioned above may be clearly understood by those skilled in the art from the following description.

First, a method of transmitting information by a terminal to a base station is described. The terminal may informatize its mobility characteristic, or each terminal may informatize the time-varying characteristic of a channel between itself and the base station.

As an example, each terminal may informatize channel time-varying characteristic between itself and the base station as follows. The category of each terminal may be determined as follows. Category 1 (Cat. 1) corresponds to a case in which the coherence time is less than ½ of a slot, category 2 (Cat. 2) corresponds to a case in which the coherence time is greater than ½ of a slot and less than 1 slot, category 3 (Cat. 3) corresponds to a case in which the coherence time is greater than 1 slot and less than 2 slots, and category 4 (Cat. 4) corresponds to a case in which the coherence time is greater than 2 slots.

Here, the coherence time means a time interval in which the channel rarely changes. For example, if the mobility of the terminal is high, the coherence time will be short, and if the terminal hardly moves, the coherence time may be long. In addition, the slot is a unit of time composed of a plurality of OFDM symbols, which may include 7 or 14 OFDM symbols.

The terminal may transmit its own category to the base station via the information shown in Table 1 below.

TABLE 1

| Categories of terminals | Information |
| --- | --- |
| Category 1 | 00 |
| Category 2 | 01 |
| Category 3 | 10 |
| Category 4 | 11 |

The description of these categories and information is just an example, and the terminal may transmit the time-varying or mobile characteristics of the channel to the base station by categories and other methods determined by other criteria.

A terminal may transmit the above information via the following method.

First, the terminal may feedback the information to a base station via control information and data transmitted on a physical uplink control channel or a physical uplink shared channel. Second, the terminal may transmit the information by adding the information to the message transmitted to the base station during the random access process. Such a message may be a message 3 corresponding to a random access preamble or a random access response. Third, the terminal may report the information to the base station in the initial access process. Fourth, the terminal may periodically update the information and report it to the base station. This method may be used in combination with one or more methods.

Secondly, a method of determining a reference signal transmission scheme of a terminal by a base station is described. The base station may determine the reference signal transmission scheme of each terminal by additionally utilizing information fed back from each terminal (mobile characteristic of a terminal or time-varying characteristic of a channel) and information that the base station can know in advance. Here, the information that the base station can know in advance may include the number of terminals to which a signal is to be superimposed on a specific resource and the amount of frequency resources allocated to the terminal (specifically, the bandwidth or the number of resource blocks (RB) allocated to the terminal).

The base station may determine a reference signal transmission scheme, based on at least one of the information, and the reference signal transmission scheme may include at least one of a transmission start position of the reference signal, a transmission interval of the reference signal onto the time axis (which may be understood as a periodicity of the reference signal), and a reference signal transmission pattern on the frequency axis.

Figure 2A:
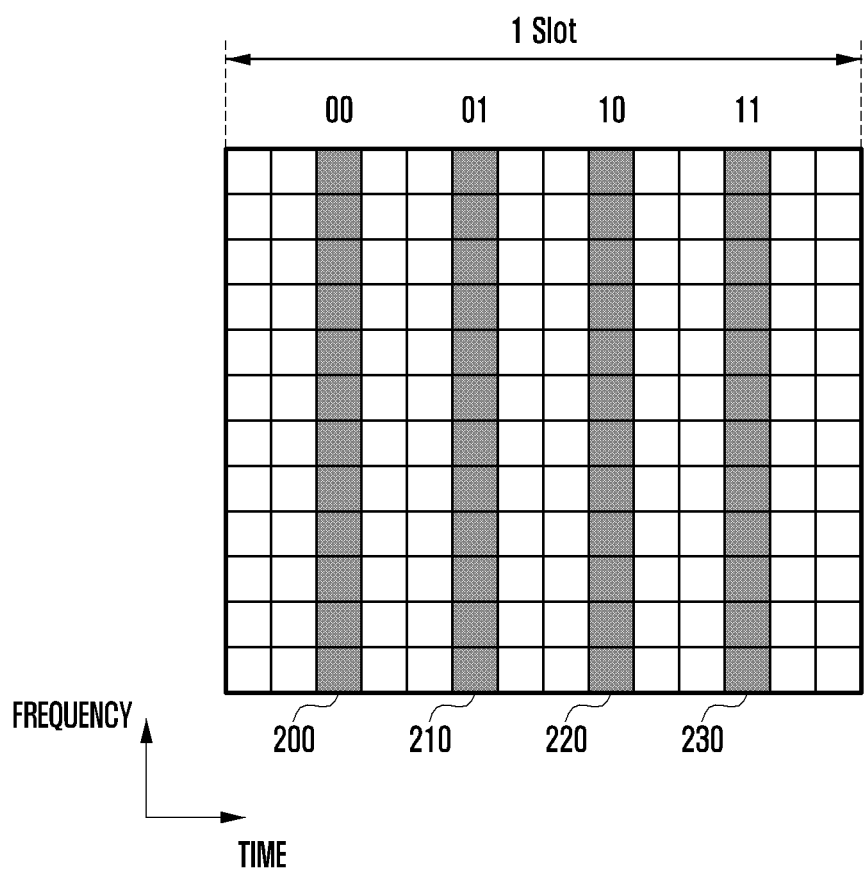
FIG. 2A is a view illustrating an example of a transmission start position of a reference signal applicable to the disclosure.

First, the base station may determine a transmission start position of a reference signal. FIG. 2A is a view illustrating an example of a transmission start position of a reference signal applicable to the disclosure. According to FIG. 2A, the reference signal transmission start position may include four types (200, 210, 220 and 230) in two RB, as shown, and this position may be indicated by 2 bits.

Second, the reference signal transmission interval onto the time axis may be determined as shown in Table 2 below. The reference signal transmission interval may be determined according to the mobile characteristic or channel time-varying characteristic of a terminal. For example, if the coherence time of a channel between a terminal and a base station is less than ½ slot, one reference signal should be located at least every ½ slot, so that the time-varying channel can be properly measured. Accordingly, in this case, the reference signal should be placed every half slot. Alternatively, if the coherence time of the channel is greater than 3 slots, the reference signal may be positioned every 3 slots to reduce the overhead of the reference signal.

TABLE 2

| Bits | Reference signal transmission time interval |
| --- | --- |
| 00 | 1/2 Slot |
| 01 | 1 Slot |
| 10 | 2 Slots |
| 11 | 3 Slots |

Figure 2B:
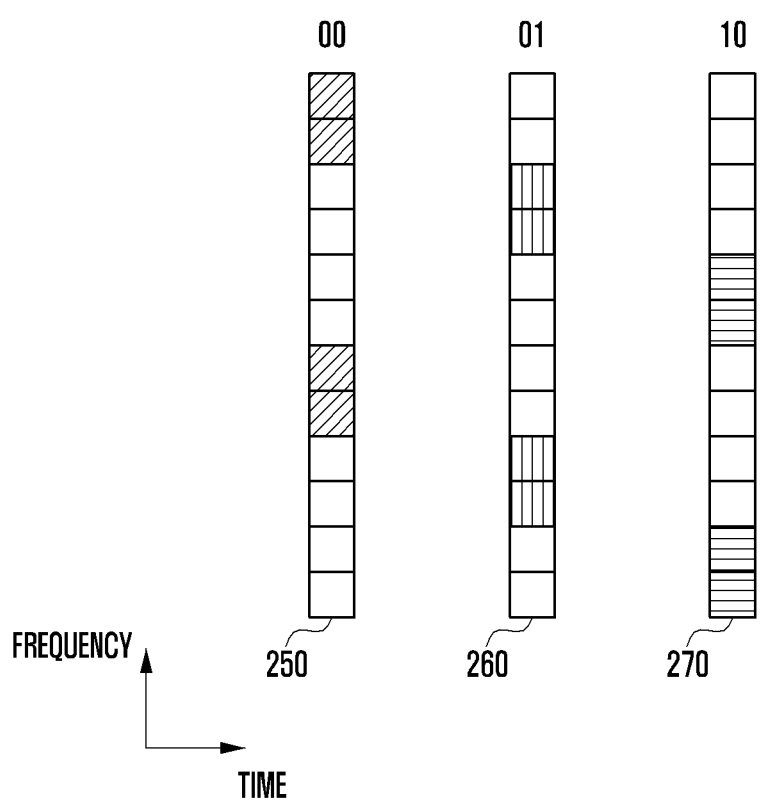
FIG. 2B is a view illustrating an example of a reference signal transmission pattern onto the frequency axis.

Third, the reference signal transmission pattern may be determined on the frequency axis. FIG. 2B is a view illustrating an example of the reference signal transmission pattern on the frequency axis. The reference signal transmission pattern may include three types 250, 260 and 270 and may be indicated by 2 bits.

Such a reference signal transmission scheme is merely an example, and the position in other frequency and time resources may be represented in a similar manner.

Therefore, the reference signal transmission scheme of each terminal, determined by a base station may be composed of at least one of a reference signal transmission start position, a reference signal transmission interval onto the time axis, a reference signal transmission pattern on the frequency axis. The base station may informatize such a reference signal transmission scheme of each terminal in a bit type.

Figure 3:
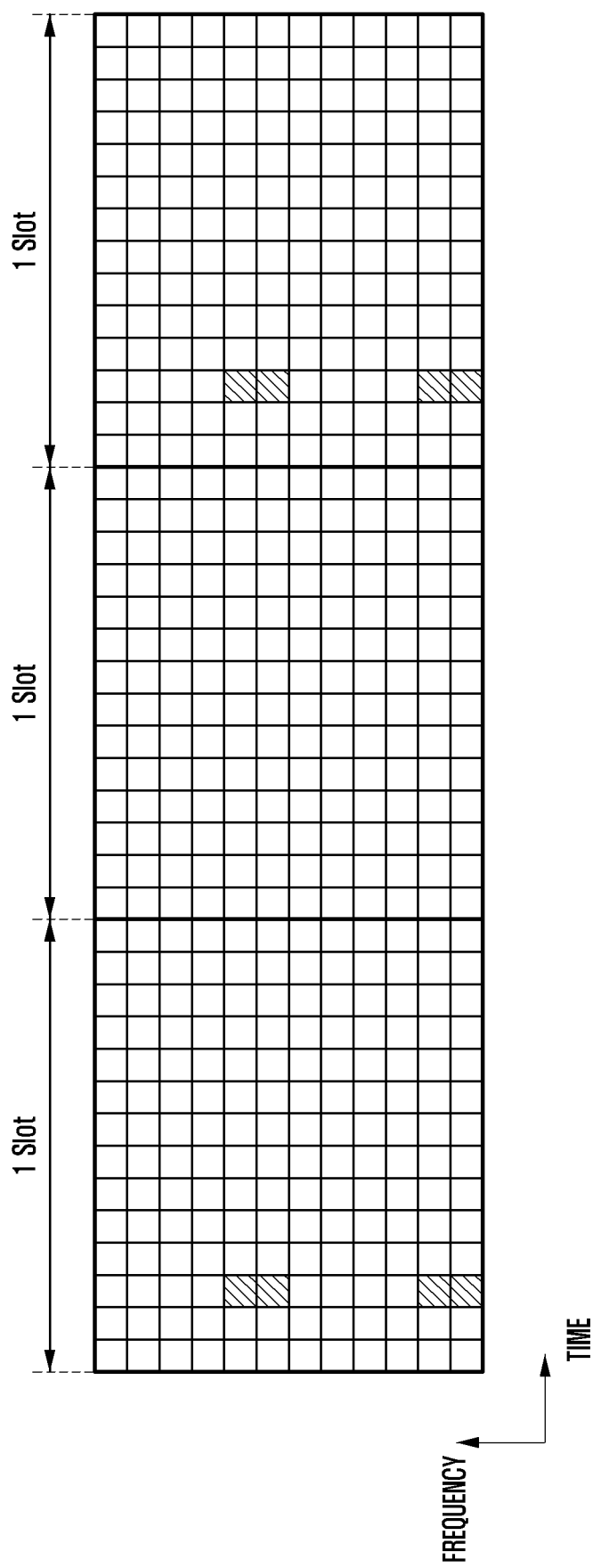
FIG. 3 is a view illustrating an example of a reference signal transmission scheme of a terminal.

FIG. 3 is a view illustrating an example of a reference signal transmission scheme of a terminal. For example, if a base station transmits a reference signal transmission start position of a specific terminal from a third OFDM symbol in the slot, configures the transmission cycle of the reference signal to 2 slots, and configures the pattern of the reference signal on the frequency axis as shown in 270 of FIG. 2B, the reference signal transmission scheme of the corresponding terminal may be expressed as "001010".

Here, 00, which is the first and second bits, indicates the transmission start position of the reference signal, which means the case of 200 of FIG. 2A. The third and fourth bits, 10, indicate a transmission cycle of the reference signal, which means two slots of Table 2. The fifth and sixth bits, 10, may indicate a pattern onto the frequency axis of the reference signal and mean the case of 270 of FIG. 2B.

The base station may determine the reference signal transmission scheme of each terminal in such a manner by combining the information fed back from each terminal and information that the base station can know in advance. At this time, the base station considers several terminals using one resource in duplicate.

Specifically, the following cases are considered. The number of terminals to perform overlapping transmission on a specific resource is six, and feedback information from the terminal is shown in Table 3 below.

TABLE 3

| Mobile characteristics of terminals | Corresponding terminals |
| --- | --- |
| Category 2 (Coherence time is greater than 1/2 slot and less than 1 slot) | Terminals 1, 2 |
| Category 3 (Coherence time is greater than 1 slot and less than 2 slots) | Terminals 3, 4 |
| Category 4 (Coherence time is greater than 2 slots and less than 3 slots) | Terminals 5, 6 |

In this situation, the base station may determine a reference signal transmission start position, a reference signal transmission cycle, and a reference signal transmission pattern of each terminal in consideration of the mobile characteristic of each terminal and the total number of the terminals performing overlapping transmission.

Figure 4:
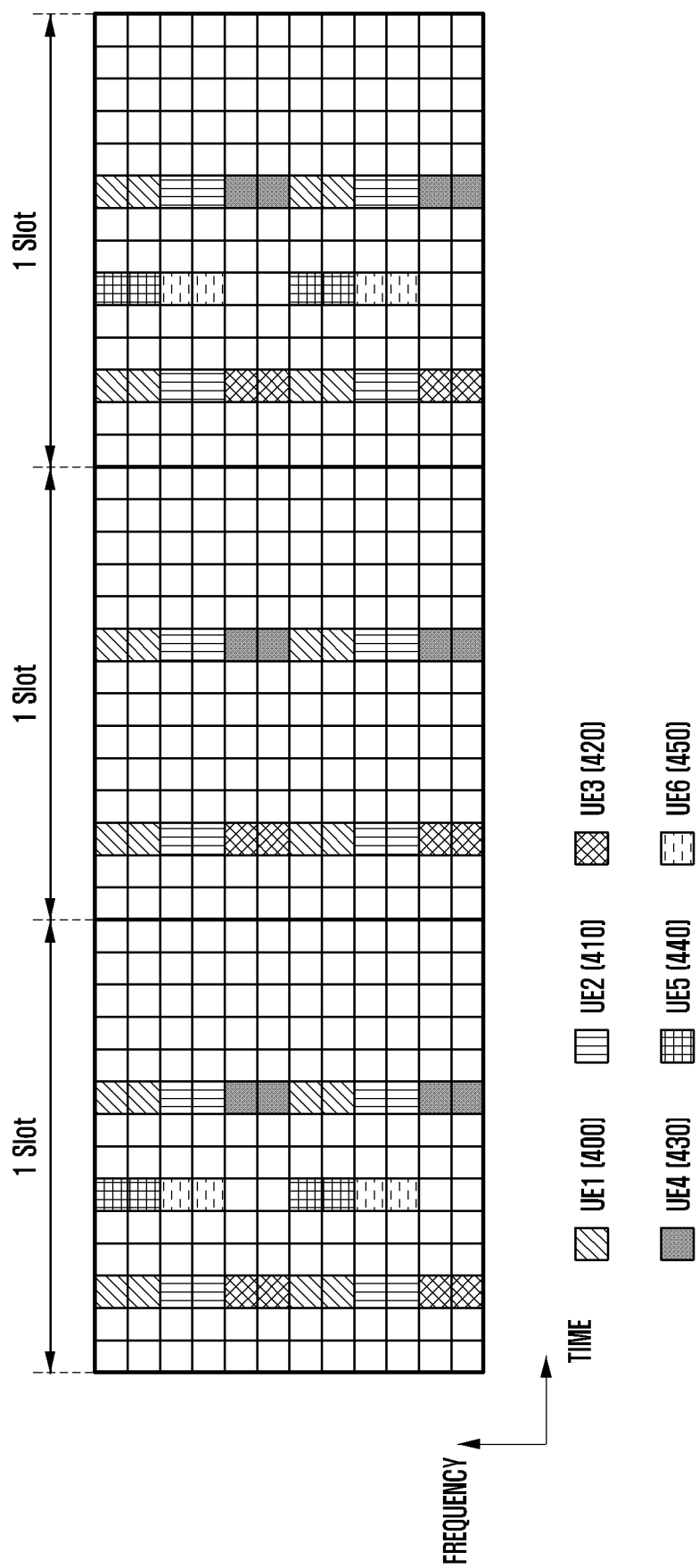
FIG. 4 is a view illustrating an example in which each terminal transmits a reference signal according to a configuration of a base station.

FIG. 4 is a view illustrating an example in which each terminal transmits a reference signal according to the configuration of a base station. The base station may indicate a reference signal transmission scheme with six bits, 000000, in the case of terminal 1 (400). In this case, the first and second bits indicate a reference signal transmission start position, which is indicated by 00. The third and fourth bits indicate a reference signal transmission interval, which is indicated by 00. The fifth and sixth bits indicate a reference signal transmission pattern onto the frequency axis, which is indicated by 00. These bits are interpreted according to the above-described method.

The base station may indicate to transmit reference signals with 000001 for terminal 2 (410), with 000010 for terminal 3 (420), with 100110 for terminal 4 (430), with 011000 for terminal 5 (440), and with 011001 for terminal 6 (450).

The base station may transmit information indicating the reference signal transmission scheme of each terminal determined as described above to each terminal. Such information may be transmitted via downlink control information (DCI) transmitted on a physical downlink control channel (PDCCH) or an enhanced-PDCCH (ePDCCH), or higher layer signaling (e.g., radio resource control (RRC) signaling or medium access control (MAC) control element (CE)).

In addition, such information may be transmitted by partially or entirely including in the DCI, RRC signaling, or MAC CE. Specifically, some of the reference signal transmission scheme information may be included in the DCI of the PDCCH. Such information may be information requiring dynamic indication, and may be, for example, information related to the number of terminals performing overlapping transmission. For example, the reference signal transmission start time information and/or the reference signal pattern onto the frequency axis may be included in the DCI and transmitted.

In addition, some of the reference signal transmission scheme information may be included in UE-specific RRC signaling or MAC CE. This is information requiring semi-static indication and may be, for example, information related to a category of a terminal performing overlapping transmission. For example, such information may include reference signal transmission interval information.

Third, a method of determining time and frequency resources for each terminal to use for data transmission will be described. When the base station determines the reference signal transmission scheme of each terminal, the base station may then determine the time and frequency resources to be used for data transmission by each terminal. This may include determining whether other terminals use or do not use the reference signal transmission resource of each terminal performing overlapping transmission.

There are three following data transmission schemes. The first scheme is a scheme in which a specific terminal does not use resources used for transmission of reference signals by other terminals performing overlapping transmission for data transmission. According to the first scheme, since data transmission of other terminals is not overlapped at the time of reference signal transmission of the terminal, the influence of an interference signal on the reference signal can be minimized and the channel estimation performance can be improved. In addition, the base station can apply a low complexity reception technology to receive signals.

The second method is that one terminal uses the remaining resources for data transmission except for the resources used for data transmission of its own reference signal, and in this case, the terminal uses reference signal transmission resources of other terminals for data transmission. At this time, resources may be used more efficiently than the first scheme, but since interference signals by other terminals may affect when the base station receives the reference signal, the channel estimation performance may be deteriorated. However, the base station can overcome the deterioration of channel estimation performance by applying an improved reception technology (e.g., an iterative detection structure). Therefore, the second scheme may be applied according to the capability of the reception algorithm of the base station.

The third scheme is a scheme in which the base station adaptively applies the first scheme and the second scheme according to the capability of the receiver algorithm.

The base station may indicate each terminal about which scheme the terminal will apply from the first, second, and third schemes and transmit the information to the terminal.

The information may be transmitted via UE-specific DCI or RRC signaling or MAC CE. In addition, since the information may be common information for the terminals performing overlapping transmission, the base station may broadcast to the terminals. In this case, it may be transmitted via DCI on the group common PDCCH. Even if not the group common DCI, the base station may transmit the information via signaling for the terminal group performing the NOMA transmission.

At this time, the terminals transmitting data according to the first scheme do not use the resources used by other terminals for transmitting a reference signal for data transmission. Therefore, each terminal needs to know the location of resources that other terminals use for transmitting the reference signal. Accordingly, the base station should inform the terminals performing overlapping transmission of the location of resources used when other terminals transmit the reference signal, and a method for this is needed.

Figure 5A:
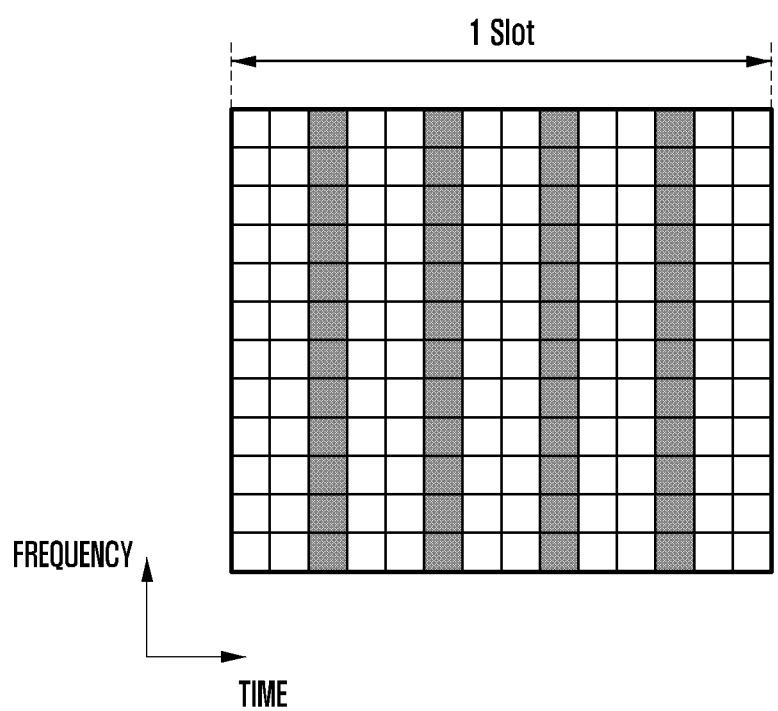
FIGS. 5A, 5B, and 5C are views illustrating resource selection units according to a supportable reference signal transmission cycle.
Figure 5B:
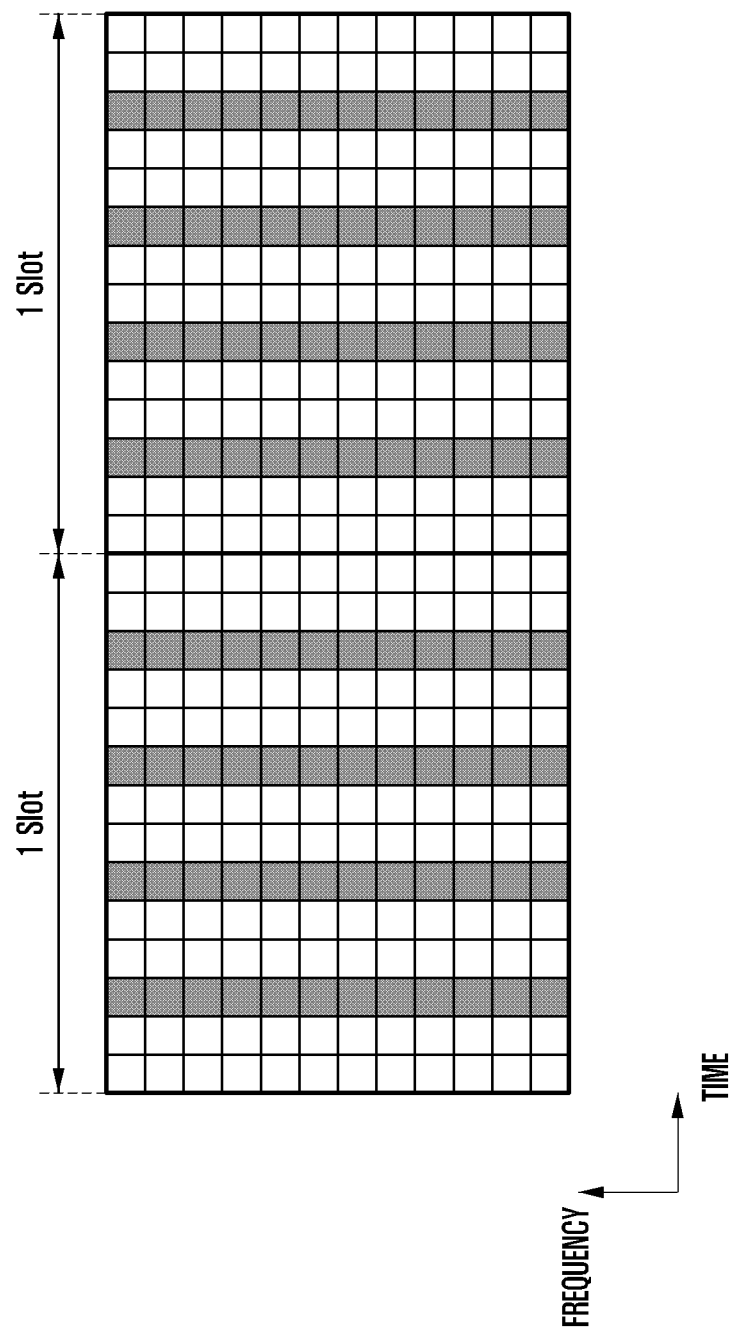
Figure 5C:
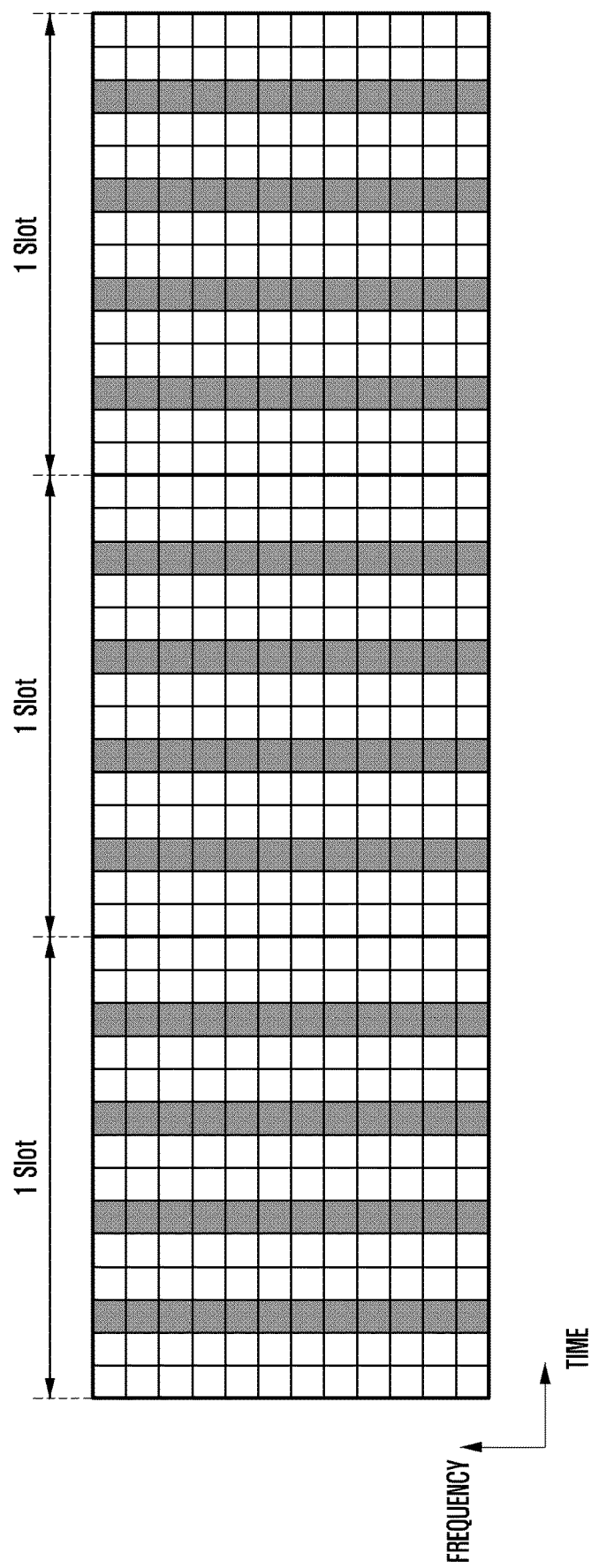

When the terminals performing overlapping transmission transmit data according to the first scheme, the base station may indicate each terminal of reference signal transmission resources of other overlapping transmission terminal as follows. The base station selects resources capable of transmitting the reference signal among time and frequency resources allocated to perform overlapping transmission. In this case, the unit of resource selection may vary according to the supportable reference signal transmission cycle value. FIG. 5A is a view illustrating resource selection units when the supportable reference signal transmission cycle value is less than 1 slot. FIG. 5B is a view illustrating resource selection units when the supportable reference signal transmission cycle value is greater than 1 slot and less than 2 slots. FIG. 5C is a view illustrating resource selection units when the supportable reference signal transmission cycle value is greater than 2 slots and less than 3 slots.

Thereafter, the base station groups the selected resources and informatize whether other terminals are used for reference signal transmission. The information may be, for example, a bitmap.

Figure 6A:
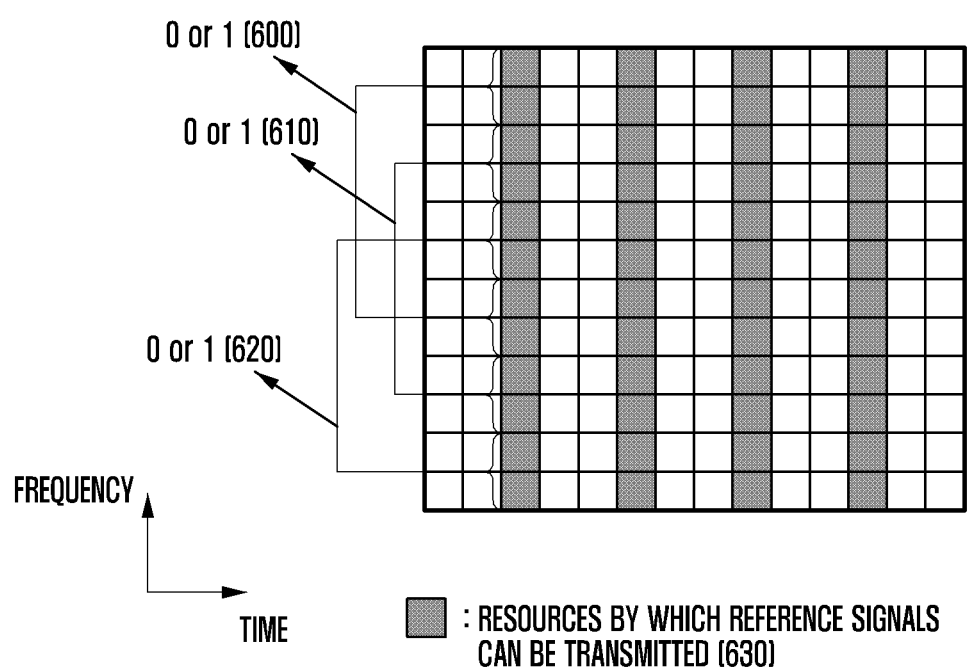
FIGS. 6A and 6B are views illustrating an example in which a bitmap indicates a resource used by another terminal for transmitting a reference signal.
Figure 6B:
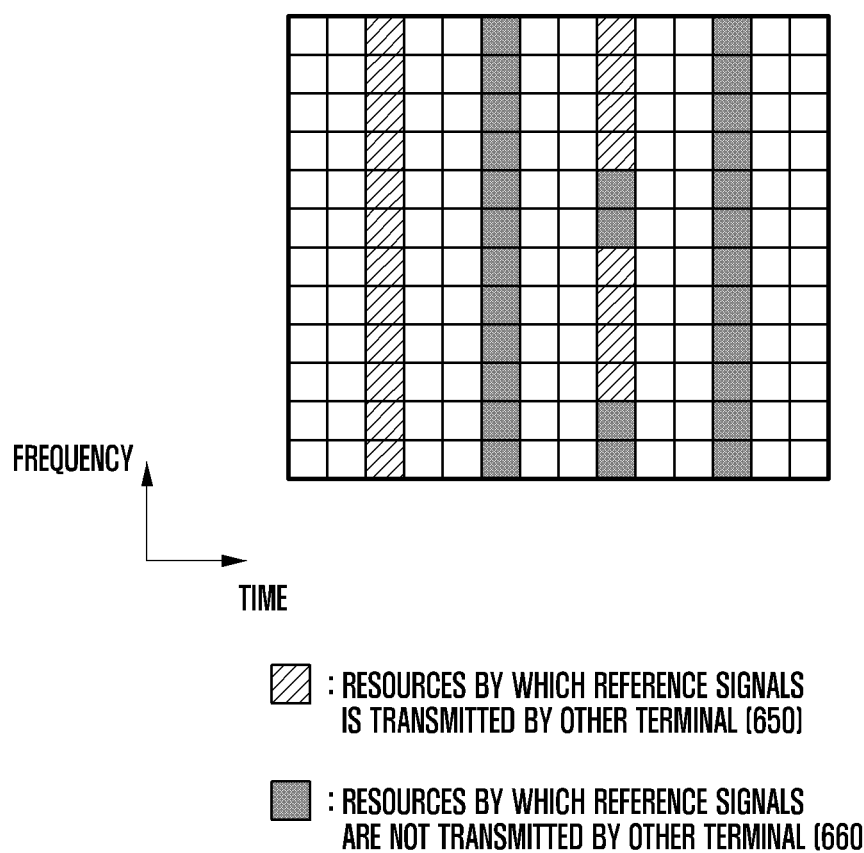

FIGS. 6A and 6B are views illustrating an example in which a bitmap indicates resources used by other terminals for reference signal transmission. In the case of FIG. 6A, 3 bits for each OFDM symbol may indicate whether each reference signal pattern in the OFDM is used. The first bit indicates a first pattern 600, the second bit indicates a second pattern 610, and the third bit indicates a third pattern 620. In FIG. 6A, each reference signal pattern is illustrated for the third OFDM symbol, and since the sixth OFDM symbol, the ninth OFDM symbol and the twelfth OFDM symbol can also indicate whether each resource is used, the total bit length becomes 12 by 3 (the number of patterns in one OFDM symbol)*4 (the number of the OFDM symbol). If the bit is 0, it means that a corresponding resource is not used, and if the bit is 1, it can be interpreted to mean that a corresponding resource is used or vice versa. In the case of FIG. 6A, there is no resource that other terminals use for transmitting the reference signal within the resource 630 through which the reference signal can be transmitted. In this case, 12 bits are 000000000000.

FIG. 6B is a view illustrating a case in which 12 bits are 111000110000. Reference numeral 650 (a resource indicated that another terminal uses it to transmit a reference signal) of FIG. 6B is indicated by 1, and reference numeral 660 (a resource indicated that another terminal does not use it to transmit a reference signal) is indicated by 0. Specifically, since the first three bits are 111, all of the third OFDM symbols are used for reference signal transmission, since the second three bits are 000, all of the sixth OFDM symbols are not used for reference signal transmission, and since the third three bits are 110, only resources corresponding to the first and second reference signal patterns of the ninth OFDM symbol are used for reference signal transmission. Since the fourth three bits are 000, all the twelfth OFDM are not used for reference signal transmission.

Since the reference signal transmission related information applied to the terminals performing overlapping transmission may be all the same, the base station may transmit the information via the DCI on the group common PDCCH. This scheme has the advantage of greatly reducing the overhead for the information transmission. The information may also be indicated dynamically or semi-statically.

At this time, the overhead may increase according to the transmission cycle of the reference signal that can be supported for the information transmission. For example, if the transmission cycle of the supportable reference signal is long (in the case of FIG. 5C), unlike the case in which the transmission cycle of the supportable reference signal is short (in the case of FIG. 5A), the size of a bitmap is large because the number of resources to be indicated by the bitmap is large. In order to solve this problem, when indicating resources used for reference signal transmission by other terminals, the overhead due to the information transmission can be reduced instead of increasing the granularity of the information by adjusting the group size of the resources.

Figure 7A:
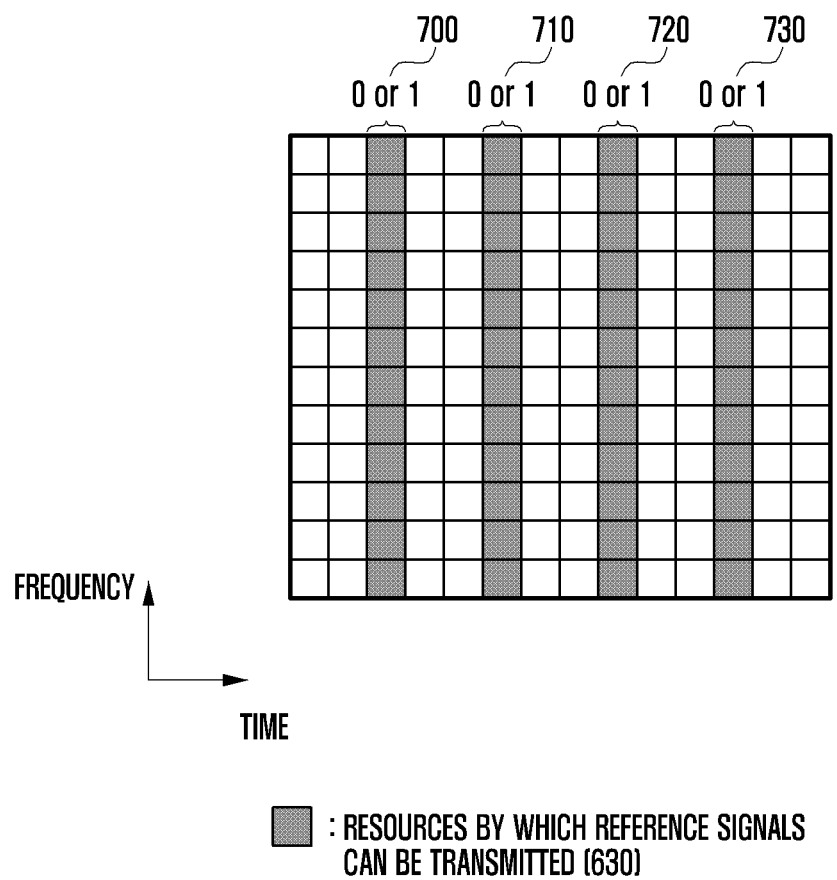
FIGS. 7A and 7B are views illustrating another example in which a bitmap indicates a resource used by another terminal for transmitting a reference signal.
Figure 7B:
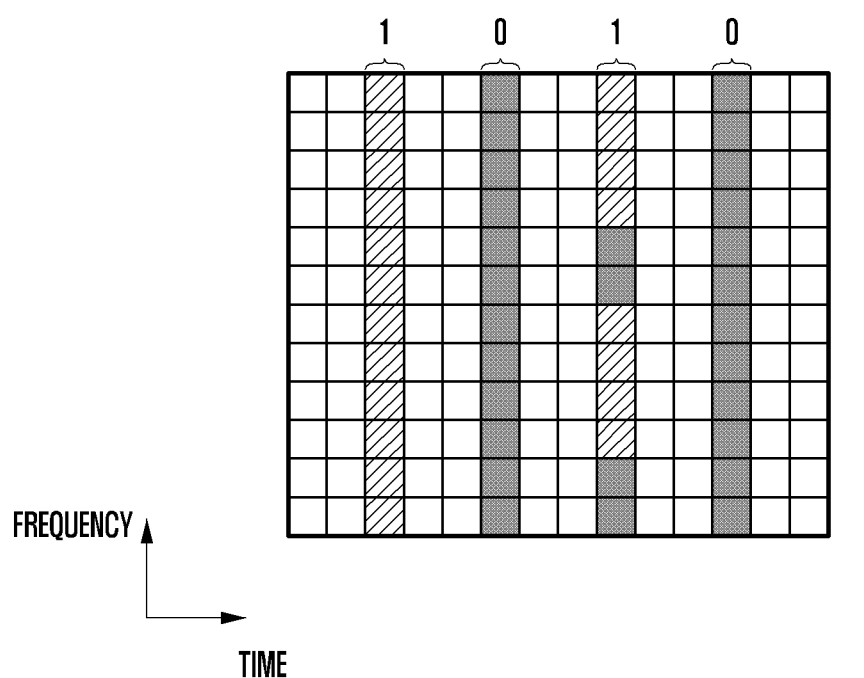

FIGS. 7A and 7B are views illustrating another example in which a bitmap indicates resources used by other terminals for reference signal transmission. According to FIG. 7A, unlike FIG. 6, one OFDM symbol is represented by one bit. That is, it is represented in 1 bit 700 whether the third OFDM symbol is used or not, in 1 bit 710 whether the sixth OFDM symbol is used or not, in 1 bit 720 whether the ninth OFDM symbol is used or not, and in 1 bit 730 whether the twelfth OFDM symbol is used or not. In this case, a resource used for reference signal transmission may be indicated by four bits, and compared with the method of FIG. 6, the amount of information can be reduced to ⅓. In this case, FIG. 7A is a view illustrating a case in which four bits are 0000, and a resource 740 to which all reference signals can be transmitted is not used by another terminal.

FIG. 7B is a view illustrating a case in which four bits are 1010. In the case of FIG. 7B, the same resource as that of FIG. 6B is used for reference signal transmission of another terminal. However, in the case of the ninth OFDM symbol, even though all resources of the OFDM symbol are not used for reference signal transmission, resources can only be indicated in symbol units, so that the entire ninth OFDM symbol is indicated by the third bit 1. Therefore, bit 1010 indicates that the third and ninth OFDM symbols are used for reference signal transmission of another terminal, and the sixth and twelfth OFDM symbols are not used for reference signal transmission of another terminal.

Since the information related to reference signal transmission applied to the terminals performing the overlapping transmission may be all the same, the base station may transmit the information via the DCI on the group common PDCCH. This approach has the advantage of greatly reducing the overhead for transmitting the information. The information may be indicated dynamically or semi-statically. As described above, the overhead may increase according to the reference signal transmission cycle that can be supported for information transmission. In order to solve this problem, one bit may indicate a plurality of OFDM symbols (that is, increase the granularity of information by adjusting the group size of resources), thereby reducing the overhead caused by the information transmission.

The terminal that transmits data in the first scheme of receiving the information may transmit data using a resource other than the resource indicated by another terminal to transmit the reference signal. In this case, the terminal may transmit data by mapping the data to a resource to which the terminal may transmit data (a resource except for the resource for transmitting its own reference signal and the resource used for transmitting the reference signal by other terminal). At this time, the terminal transmits data to the base station on a resource capable of transmitting data using rate matching or puncturing.

In addition, when the terminals performing overlapping transmission use the first scheme, power boosting for a reference signal may be applied. This is because the terminal does not use resources used for transmission of the reference signals by other terminals for data transmission, and thus uses power not used in the resources when transmitting its own reference signal.

The base station may configure a UE-specific power boosting value for each terminal in consideration of resources used by each terminal for data transmission, and transmit the value to each terminal. This value may be, for example, 0 dB, 3 dB, 3 dB, 9 dB, etc., and the value may be transmitted from the base station to the terminal using DCI or RRC signaling or MAC CE on the PDCCH.

FIG. 8 is a view illustrating a method performed by a terminal according to the disclosure.

Referring to FIG. 8, in step 800, the terminal may transmit information related to a mobile characteristic or a channel time-varying characteristic to a base station. Such channel time-varying characteristic related information may be indicated by a category to which the terminal belongs. Thereafter, in step 810, the terminal may receive reference signal transmission related information determined based on the mobile characteristic or channel time-varying characteristic related information from the base station. The reference signal transmission related information may be information including at least one of reference signal transmission start position information, reference signal transmission cycle information, and reference signal transmission pattern information of each terminal. In step 820, the terminal may generate a signal including a reference signal according to the received reference signal transmission related information, and transmit an uplink signal including the generated reference signal to the base station. Each step of FIG. 8 does not necessarily need to be performed in all steps, but may be performed selectively.

Figure 9:
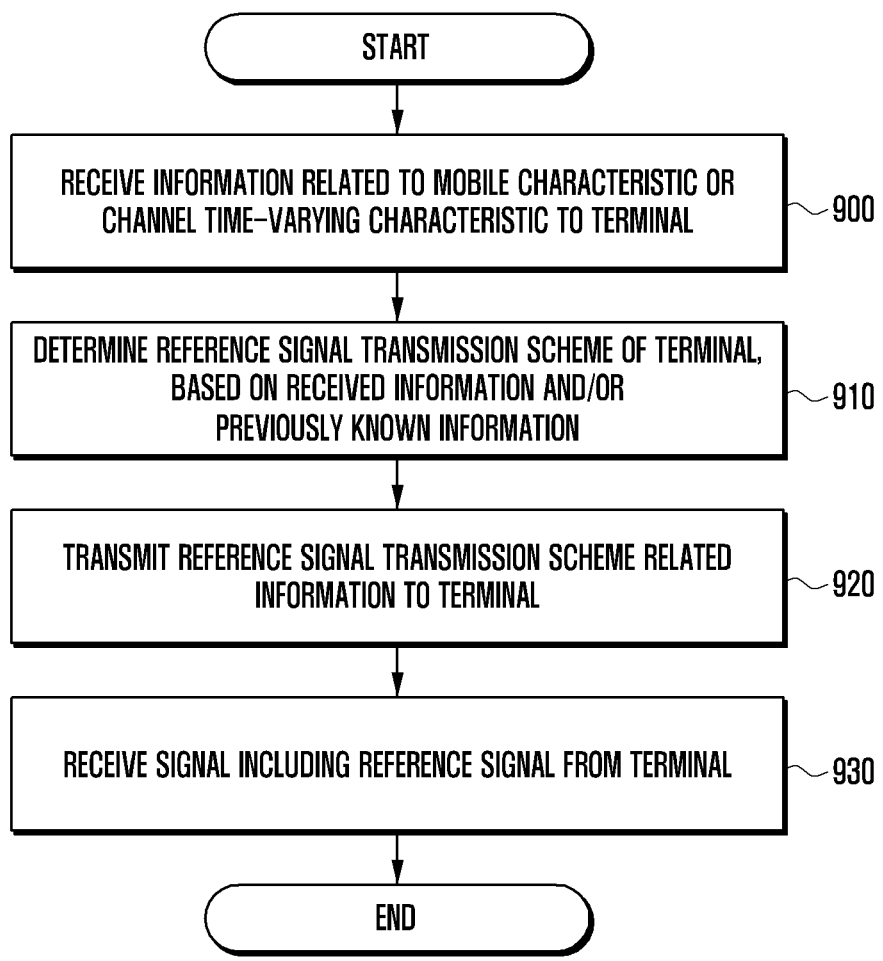
FIG. 9 is a view illustrating a method performed by a base station according to the disclosure.

FIG. 9 is a view illustrating a method performed by a base station according to the disclosure.

According to FIG. 9, in step 900, the base station receives information related to a mobile characteristic or a channel time-varying characteristic from a terminal. In step 910, the base station determines a reference signal transmission scheme of each terminal, based on at least one of information that the base station can know in advance and information regarding the received mobile characteristic or channel time-varying characteristic. In step 920, the base station transmits reference signal transmission related information indicating the determined reference signal transmission scheme to the terminal. The reference signal transmission related information may be information including at least one of reference signal transmission start position information, reference signal transmission cycle information, and reference signal transmission pattern information of each terminal. In step 930, the base station receives the information including a reference signal from the terminal, and the reference signal is transmitted according to the reference signal transmission related information. Each step of FIG. 9 does not necessarily need to be performed in all steps, but may be performed selectively.

Also, in the disclosure, the reference signal may include a demodulation reference signal (DMRS), but is not limited thereto.

Figure 10:
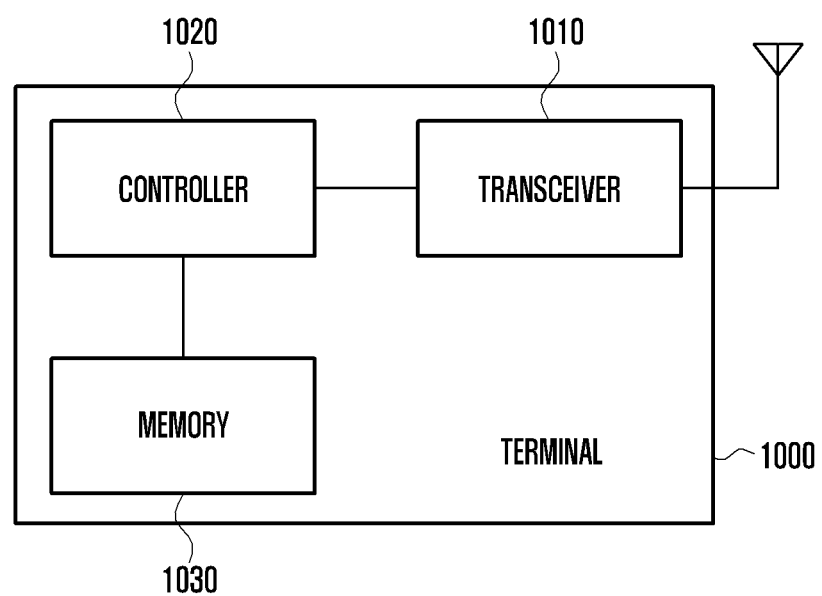
FIGS. 10 and 11 are block diagrams illustrating a terminal device and a base station device capable of carrying out the disclosure.
Figure 11:
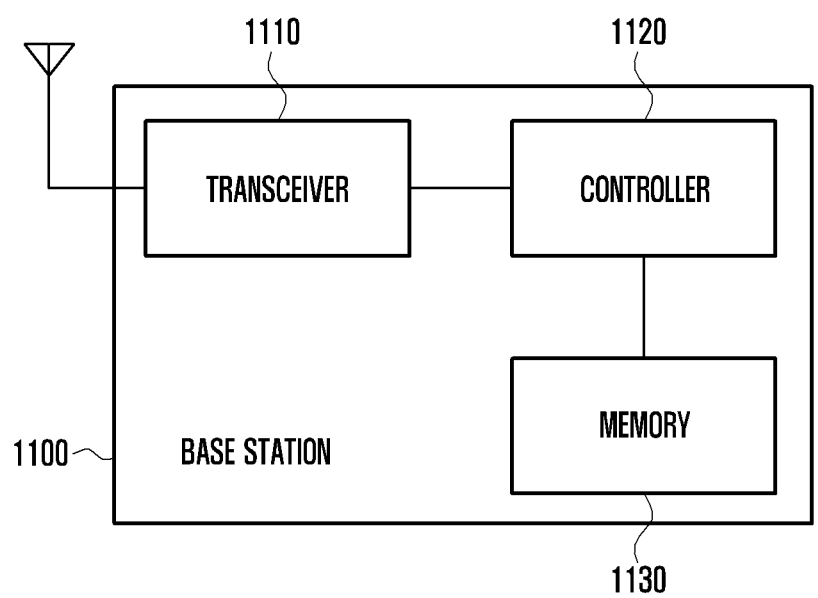

FIGS. 10 and 11 are block diagrams illustrating a terminal device and a base station device capable of carrying out the disclosure.

FIG. 10 is a view illustrating a structure of a terminal 1000 capable of performing the disclosure. Referring to FIG. 10, the terminal 1000 may include a transceiving unit 1010, a controller 1020, and a memory 1030. In the disclosure, the controller may be defined as a circuit or application specific integrated circuit or at least one processor.

The transceiving unit 1010 may transmit and receive a signal with a base station. The transceiving unit 1010 may transmit information related to a mobile characteristic or a channel time-varying characteristic of the terminal and a reference signal to the base station, and may receive reference signal transmission related information from the base station, for example.

The controller 1020 may control the overall operation of the terminal according to the embodiment proposed by the disclosure. For example, the controller 1020 may control a signal flow between blocks to perform an operation according to the flowchart described above. Specifically, the controller 1020 may control the transceiving unit and the memory to perform the operation proposed by the disclosure for transmitting and receiving information according to an embodiment of the disclosure.

The memory 1030 may store at least one of information transmitted and received through the transceiving unit 1010 and information generated through the controller 1020. For example, the memory 1030 may store the reference signal transmission related information transmitted by the base station.

FIG. 11 is a view illustrating a structure of a base station according to an embodiment of the disclosure.

Referring to FIG. 11, the base station may include a transceiving unit 1110, a controller 1120, and a memory 1130. In the disclosure, the controller may be defined as a circuit or application specific integrated circuit or at least one processor.

The transceiving unit 1110 may transmit and receive a signal with a terminal. The transceiving unit 1110 may receive information related to a mobile characteristic or a channel time-varying characteristic of a terminal and a reference signal from the terminal, may transmit reference signal transmission related information to the terminal, and may transmit a sync signal or a reference signal, for example.

The controller 1120 may control the overall operation of the base station according to the embodiment proposed by the disclosure. For example, the controller 1120 may control a signal flow between blocks to perform an operation according to the flowchart described above. Specifically, the controller 1120 may control the transceiver and the memory to perform the operation proposed by the disclosure for transmitting and receiving information according to an embodiment of the disclosure.

The memory 1130 may store at least one of information transmitted and received through the transceiving unit 1110 and information generated through the controller 1120. For example, the memory 1130 may store information related to a mobile characteristic or a channel time-varying characteristic transmitted by the terminal, and may store information related to a reference signal transmission scheme of the terminal generated by the controller 1120.

The invention claimed is:

1. A method of a terminal of a communication system, the method comprising:
   transmitting first information associated with coherence time of the terminal to a base station;
   receiving second information associated with a reference signal transmission scheme from the base station, the second information being determined based at least in part on the first information, a number of terminals performing an overlapping transmission, and a frequency resource allocated to the terminal;
   generating a reference signal, based on the second information; and
   transmitting the reference signal to the base station,
   wherein the second information includes a transmission start position of the reference signal, a time interval of the reference signal, and a frequency interval of the reference signal.

2. The method as claimed in claim 1, further comprising:
   receiving third information associated with a data transmission scheme of the terminal; and
   transmitting data based on the data transmission scheme,
   wherein the third information is associated with a resource to be used for a reference signal transmission of other terminals performing an overlapping transmission.

3. The method as claimed in claim 1, wherein information associated with the transmission start position of the reference signal and the frequency interval of the reference signal is received by downlink control information, and information associated with the time interval of the reference signal is received via higher layer signaling.

4. A method of a base station of a communication system, the method comprising:
   receiving first information associated with a coherence time of a terminal from the terminal;
   determining a reference signal transmission scheme of the terminal, based at least in part on the first information, a number of terminals performing an overlapping transmission, and a frequency resource allocated to the terminal;
   transmitting second information associated with the reference signal transmission scheme to the terminal; and
   receiving a reference signal from the terminal,
   wherein the second information includes a transmission start position of the reference signal, a time interval of the reference signal, and a frequency interval of the reference signal.

5. The method as claimed in claim 4, further comprising:
   transmitting third information associated with a data transmission scheme of the terminal; and
   receiving data transmitted according to the data transmission scheme,
   wherein the third information is associated with a resource to be used for a reference signal transmission of other terminals performing an overlapping transmission.

6. The method as claimed in claim 4, wherein information associated with the transmission start position of the reference signal and the frequency interval of the reference signal is transmitted by downlink control information, and information associated with the time interval of the reference signal is transmitted via higher layer signaling.

7. The method as claimed in claim 4, wherein the time interval of the reference signal is determined based on the first information.

8. A terminal of a communication system, the terminal comprising:
   a transceiver; and
   a controller configured to:
      transmit first information associated with a coherence time of the terminal to a base station,
      receive second information associated with a reference signal transmission scheme from the base station, the second information being determined based at least in part on the first information, a number of terminals performing an overlapping transmission, and a frequency resource allocated to the terminal,
      generate a reference signal, based on the second information, and
      transmit the reference signal to the base station,
   wherein the second information includes a transmission start position of the reference signal, a time interval of the reference signal, and a frequency interval of the reference signal.

9. The terminal as claimed in claim 8,
   wherein the controller is further configured to:
      receive third information associated with a data transmission scheme of the terminal, and
      transmit data based on the data transmission scheme, and
   wherein the third information is associated with a resource to be used for a reference signal transmission of other terminals performing an overlapping transmission.

10. The terminal as claimed in claim 8, wherein information associated with the transmission start position of the reference signal and the frequency interval of the reference signal is received by downlink control information, and information associated with the time interval of the reference signal is received via higher layer signaling.

11. A base station of a communication system, the base station comprising:
    a transceiver; and
    a controller configured to:
       receive first information associated with a coherence time of a terminal from a terminal,
       determine a reference signal transmission scheme of the terminal, based at least in part on the first information, a number of terminals performing an overlapping transmission, and a frequency resource allocated to the terminal,
       transmit second information associated with the reference signal transmission scheme to the terminal, and
       receive a reference signal from the terminal,
    wherein the second information includes a transmission start position of the reference signal, a time interval of the reference signal, and a frequency interval of the reference signal.

12. The base station as claimed in claim 11,
    wherein the controller is further configured to:
       transmit third information associated with a data transmission scheme of the terminal, and
       receive data transmitted according to the data transmission scheme, and
    wherein the third information is associated with a resource to be used for a reference signal transmission of other terminals performing an overlapping transmission.

13. The base station as claimed in claim 11, wherein information associated with the transmission start position of the reference signal and the frequency interval of the reference signal is transmitted by downlink control information, and information associated with the time interval of the reference signal is transmitted via higher layer signaling.

14. The base station as claimed in claim 11, wherein the time interval of the reference signal is determined based on the first information.

* * * * *